US010795314B1

(12) United States Patent
van der Gracht

(10) Patent No.: US 10,795,314 B1
(45) Date of Patent: Oct. 6, 2020

(54) FAR FIELD VIEWING DEVICES FOR MINIMAL SPURIOUS IMAGE NOISE

(71) Applicant: HoloSpex, Inc., Columbia, MD (US)

(72) Inventor: Joseph van der Gracht, Columbia, MD (US)

(73) Assignee: Holospex, Inc., Columbia, MD (US)

( * ) Notice: Subject to any disclaimer, the term of this patent is extended or adjusted under 35 U.S.C. 154(b) by 0 days.

(21) Appl. No.: 16/528,817

(22) Filed: Aug. 1, 2019

(51) Int. Cl.
*G03H 1/26* (2006.01)
*G03H 1/02* (2006.01)
*G03H 1/08* (2006.01)

(52) U.S. Cl.
CPC ............... *G03H 1/024* (2013.01); *G03H 1/08* (2013.01)

(58) Field of Classification Search
CPC ............ G03H 1/00; G03H 1/02; G03H 1/024; G03H 1/08–0808; G03H 1/0248; G03H 1/0252; G03H 1/0272; G03H 1/0486; G03H 1/0841; G03H 1/0891; G03H 1/16; G03H 1/26; G03H 1/23–30; G03H 2001/0296; G03H 2001/04; G03H 2001/0816; G03H 2001/085; G03H 2001/2605–2635; G03H 2270/00; G03H 2270/55
USPC ........................................................ 359/22, 1
See application file for complete search history.

(56) References Cited

U.S. PATENT DOCUMENTS 5,546,198 A 8/1996 van der Gracht et al.
RE39,864 E 10/2007 Athale et al.
7,301,683 B2 * 11/2007 Tanaka ..................... G03H 1/08 359/9

OTHER PUBLICATIONS

PixInsight, (Image Integration, Feb. 18, 2014, https://pixinsight.com/doc/tools/ImageIntegration/ImageIntegration.html#clip _low_ range, pp. 1-41) (Year: 2014).*
Gallagher, et al., "Method for Computing Kinoforms that Reduces Image Reconstruction Error", Applied Optics, vol. 12, No. 10, pp. 2327-2335, (Oct. 1973).
Wyrowski, et al., "Computer-generated holography: hologram repetition and phase manipulations", J. Opt. Soc. Am. A, vol. 4, No. 4, pp. 694-698, (Apr. 1987).
Mait, "Understanding diffractive optic design in the scalar domain", J. Opt. Soc. Am. A., vol. 12, No. 10, pp. 2145-2158, (Oct. 1995).
Herzig, "Micro-Optics Elements, systems and applications", Chapter 4, Institute of Microtechnology, University of Neuchatel, Switzerland, Taylor & Francis Ltd., 45 pages, (1997).
Herzig, "Micro-Optics Elements, systems and applications", Chapter 6, Institute of Microtechnology, University of Neuchatel, Switzerland, Taylor & Francis Ltd., 27 pages, (1997).

* cited by examiner

*Primary Examiner* — Jade R Chwasz
*Assistant Examiner* — Jyotsna V Dabbi
(74) *Attorney, Agent, or Firm* — The Marbury Law Group, PLLC

(57) ABSTRACT

Systems, methods, and devices are provided relating to far field hologram viewing devices. A method of designing and manufacturing a far field hologram is provided. Holographic light patterns with minimal spurious pixel errors in the hologram response may be produced without requiring a tight tolerance on the relative positions of the hologram and an observer's eye. Far field viewing devices, and methods for making the same, that employ multiple unit holograms each having differing noise characteristics that superpose in a way to reduce the effects of spurious pixel errors while maintaining good overall noise performance.

19 Claims, 11 Drawing Sheets

220
116
100
110
112
118
114

FAR FIELD VIEWING DEVICES FOR MINIMAL SPURIOUS IMAGE NOISE

FIELD

The present disclosure relates to improving light patterns created by a computer generated far field hologram. More specifically, the present disclosure relates to reducing isolated pixel errors in a holographic light pattern when viewed through a far field viewing device.

BACKGROUND

Holograms of many different types have become commonplace in modern society. They are used as ornaments and as novelty items, as well as security devices on credit cards. A hologram is a pattern recorded or applied to a substrate that provides a predetermined light diffraction effect.

There are many different types of holograms that are differentiated from one another by their optical properties and behavior. Most of the commonly seen holograms depend upon reflection of light from the hologram to the observer's eye. Less commonly seen are transmission type holograms wherein light passes through the hologram.

When an observer looks through a far field hologram at a scene that contains compact bright points of light, the observer sees holographic diffracted light patterns associated with each bright point location. This unique form of display holography is referred to herein as a far field viewing application. Far field viewing devices are comprised of physical apertures (or frames) and far field holograms combined in a way designed for viewing scenes and superimposing holographic light patterns around each compact bright point of light in the scene. A salient aspect of far field viewing applications that is different from most display hologram applications is that the observer is encouraged not to focus all of the attention on the holographic diffracted light pattern. Instead, the observer focuses on an overall scene in a unique combination with the holographic diffracted light patterns at each bright point source of light present in the scene. If the hologram is poorly designed or fabricated, the overall effect suffers. Accordingly, there is a need for quality design and fabrication of far field holograms.

SUMMARY

Various embodiments may provide a far field hologram viewing device. Various embodiments may provide a method of designing and manufacturing a far field hologram. Various embodiments may provide a procedure that is consistent with established cost-effective hologram design and fabrication processes. Various embodiments may produce holographic light patterns with minimal spurious pixel errors in the hologram response without requiring a tight tolerance on the relative positions of the hologram and an observer's eye. A spurious pixel error is an individual pixel error in the holographic reconstruction that has a significant magnitude relative to the mean error, thus potentially creating a noticeable deviation from the desired image effect. Various embodiments may include far field viewing devices employing multiple unit holograms each having differing noise characteristics that superpose in a way to reduce the effects of spurious pixel errors while maintaining good overall noise performance. Various embodiments may enable the design of multiple unit hologram regions and a subsequent selection process that creates a total holographic effect that reduces spurious pixel errors while maintaining good overall noise performance. The implementation of the hologram may be critical to achieve the desired viewing conditions.

Various embodiments may be implemented in a viewing device for viewing by a user. The device may include a support structure and a far field transmission hologram. The far field transmission hologram may be supported by the support structure, and the far field transmission hologram may have a graphic image encoded therein. When the support structure is disposed in a viewing position of the user, the graphic image may be superimposed on a natural scene as viewed by the user through the hologram. The superimposed graphic image may have minimal spurious errors. Various embodiments may be implemented in such a viewing device where the support structure takes the form of a spectacle frame having lens apertures. The far field transmission hologram may be disposed in one or both of the lens apertures of the frame. Various embodiments may be implemented in such a viewing device where the support structure takes the form of a monocle frame having a lens. The far field transmission hologram may be disposed in the lens aperture of the frame. Various embodiments may be implemented in an optical device having a reflective far field hologram.

Various embodiments may provide a method of generating a far field transmission hologram. The method may include the step of altering an optical property of a substrate to form a number of substantially shift-invariant far field unit holograms that each have the same graphic image encoded therein.

Various embodiments may provide a method of generating a far field transmission hologram. The method may include the step of altering an optical property of a substrate to form a number of substantially shift-invariant far field unit holograms that each have the same graphic image encoded therein where each unit hologram has low spurious noise terms.

Various embodiments may provide a method for making a far field transmission hologram that may include generating a superset of different candidate hologram designs from an ideal image, selecting a number of holograms from the superset of different candidate holograms, and arranging the selected holograms into a cluster of holograms repeated to form a larger digital hologram. In various embodiments, selecting the number of holograms from the superset of different candidate holograms may include selecting the number of holograms from the superset of different candidate holograms such that each of the selected holograms has a hologram response with a maximum spurious noise term below a noise threshold. In various embodiments selecting the number of holograms from the superset of different candidate holograms may include selecting the number of holograms from the superset of different candidate holograms corresponding to lowest error measures among the superset of different candidate holograms. In various embodiments, selecting the number of holograms from the superset of different candidate holograms may include displaying simulated responses for each of the superset of different candidate holograms and visually evaluating the displayed simulated responses to select the number of holograms from the superset of different candidate holograms. In various embodiments, selecting the number of holograms from the superset of different candidate holograms may include determining for each of the superset of different candidate holograms a spurious error measurement as a number of pixels in the candidate hologram's respective error image that are greater than a constant multiplied by a standard deviation of the candidate hologram's respective error image, and selecting the number of holograms from the superset of different candidate holograms such that the selected holograms have the lowest relative spurious error measurements of the superset of different candidate holograms. In various embodiments, the constant may be 3.5. In various embodiments, each of the selected holograms may be a different amplitude hologram. In various embodiments, each of the selected holograms may be a different phase hologram. In various embodiments, the number of holograms from the superset of different candidate holograms is four. In various embodiments, the superset of different candidate hologram designs may be ten different candidate hologram designs. In various embodiments, the method may include forming a physical hologram from the larger digital hologram; and mounting the physical hologram in a frame of a far field viewing device. In various embodiments, the frame may be a spectacle frame, a monocular eyepiece, a window frame, or a rigid frame designed for use in a camera.

Various embodiments may provide a method for making a far field transmission hologram including generating a superset of different candidate phase hologram designs from an ideal image, displaying simulated responses for each of the superset of different phase candidate holograms, visually evaluating the displayed simulated responses, selecting a number of phase holograms from the superset of different candidate phase holograms based at least in part on the visual evaluation of the displayed simulated responses, and arranging the selected phase holograms into a cluster of phase holograms repeated to form a larger digital phase hologram. In some embodiments, the number of phase holograms from the superset of different candidate phase holograms may be four. In some embodiments, the superset of different candidate phase hologram designs may be ten different candidate phase hologram designs. In various embodiments, the method may include forming a physical hologram from the larger digital phase hologram; and mounting the physical hologram in a frame of a far field viewing device. In various embodiments, the frame may be a spectacle frame, a monocular eyepiece, a window frame, or a rigid frame designed for use in a camera.

Various embodiments may provide a method for making a far field transmission hologram including generating a superset of different candidate amplitude hologram designs from an ideal image, determining for each of the superset of different candidate amplitude holograms a spurious error measurement as a number of pixels in the candidate amplitude hologram's respective error image that are greater than a constant multiplied by a standard deviation of the candidate amplitude hologram's respective error image, selecting a number of amplitude holograms from the superset of different candidate amplitude holograms such that the selected amplitude holograms have the lowest relative spurious error measurements of the superset of different candidate amplitude holograms, and arranging the selected amplitude holograms into a cluster of amplitude holograms repeated to form a larger digital amplitude hologram. In some embodiments, the number of amplitude holograms from the superset of different candidate amplitude holograms may be four. In some embodiments, the superset of different candidate amplitude hologram designs may be ten different candidate amplitude hologram designs. In some embodiments, the constant may be 3.5. In various embodiments, the method may include forming a physical hologram from the larger digital amplitude hologram; and mounting the physical hologram in a frame of a far field viewing device. In various embodiments, the frame may be a spectacle frame, a monocular eyepiece, a window frame, or a rigid frame designed for use in a camera.

Various embodiments may be implemented in a filter for use with a camera that has a light gathering path and an image sensor. The filter may include a far field transmission hologram that has a graphic image encoded therein. The far field transmission hologram may be adapted for mounting in the light gathering path. When the far field transmission hologram is mounted in the light gathering path, the graphic image may be superimposed on a natural scene as viewed by the image sensor through the hologram. The superimposed graphic image may have minimal spurious errors.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Figure 3A:
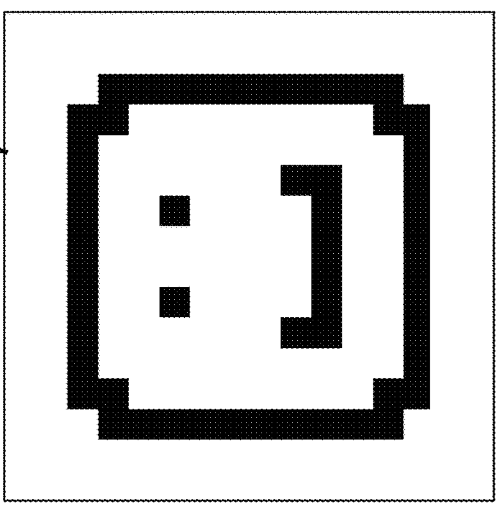
FIG. 3A illustrates a desired image, a corresponding binary amplitude far field hologram, and a computer simulated hologram response.
Figure 3A:
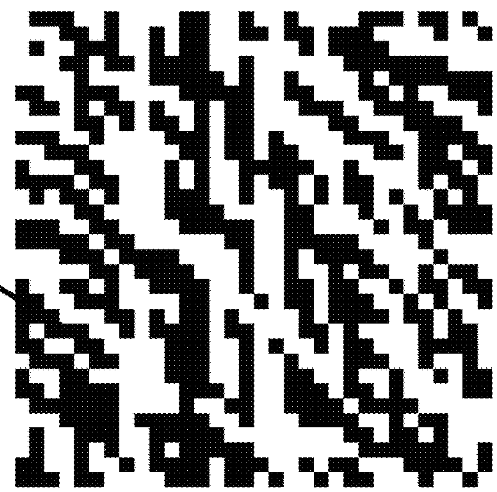
Figure 3A:
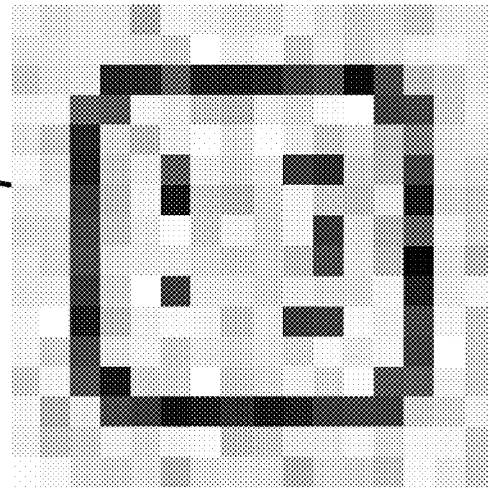

An example of an algorithm for calculating computer generated holograms is described by N. C. Gallagher and B. Liu in "Method for Computing Kinoforms That Reduces Image Reconstruction Error" Applied Optics, v. 12, pp. 2328-2335 (1973)(hereinafter referred to as "Gallagher"), hereby incorporated by reference in its entirety. Referring to FIG. 3A, the input to the algorithm is a relatively simple image such as the smile face 301. The output of the algorithm is a set of numerical values corresponding to the hologram. Each value corresponds to the desired complex light transmittance at a different spatial location on the physical hologram. For the simple case of a binary amplitude hologram, each pixel in the digital representation of the hologram is a zero or a 255 corresponding in the physical hologram to a tiny clear or opaque square. When visualized on a computer screen, a binary amplitude hologram designed to produce an arbitrary image like a smile face has the appearance of a random array of zeros and ones as seen in 302. For the case of a phase hologram, each pixel in the digital representation of the hologram is a value between zero and 255 (or 0 and 2 $\pi$ radians) and corresponds physically to a tiny clear square producing an optical delay between zero and one wavelength of the light source. The designer can visualize the digital hologram itself as a grey scale image on a computer screen, but it will typically appear to a casual observer as a random array of grey valued pixels. An appropriate Fourier transform of the digital hologram can be computed and visualized on a computer to observe the predicted hologram response 303 which should be an approximation to the desired image. (Note that for ease of illustration and discussion only one quadrant of the response is shown in FIG. 3A since a binary amplitude hologram also generates a reversed and upside-down copy of the image in the lower right quadrant). The resultant hologram data set is used to drive any of a variety of fabrication methods which impose the desired transmittance values onto a physical substrate. There are a number of methods for producing a physical computer-generated hologram from a set of data. Many of these are summarized in the textbook MICROOPTICS (editor Hans P. Herzig, published by Taylor and Francis, London 1997) in chapter 4. The entirety of MICROOPTICS is hereby incorporated by reference for all purposes. An original hologram can be used as a master and copied or replicated using a variety of techniques as discussed in chapter of 6 of MICROOPTICS.

Figure 1:
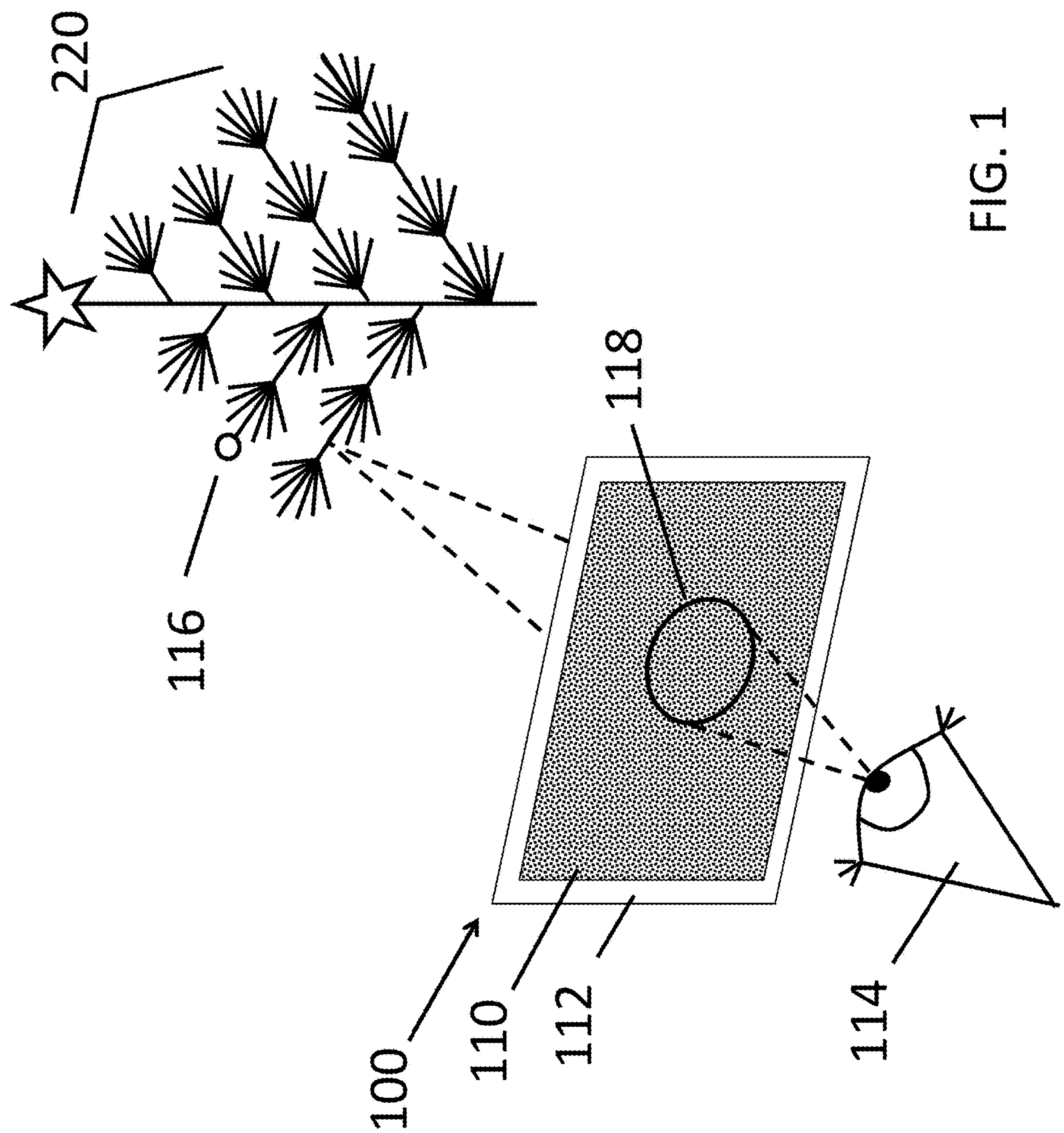
FIG. 1 illustrates schematically the eye of a human observer looking through a far field viewing device.

FIG. 1 illustrates schematically the eye of a human observer looking through a far field viewing device. Referring to FIG. 1, a far field viewing device 100 containing a far field hologram 110 mounted in a frame 112 is illustrated. The far field viewing device 100 is placed in front of an observer's eye 114. The observer's eye 114 looks through far field hologram 110 mounted in frame 112 at a scene containing at least one bright compact source of light 116. Each point in the scene is viewed through a utilized hologram area 118. When the hologram is far from the eye, the size of the utilized hologram area 118 is determined by the field of view of the eye and the distance from the eye to the hologram. When the hologram is mounted in spectacle frames, the hologram is very close to the eye and the utilized area 118 is approximately equal to the size of the pupil of the eye.

Examples of far field viewing devices include devices containing far field holograms as described in U.S. Pat. Nos. 5,546,198 and RE39,864, both hereby incorporated by reference in their entireties for all purposes. Ordinarily, a human observer looks through a far field device. However, far field devices can also be incorporated into film-based or electronic image capture devices, such as still or motion cameras.

Figure 2:
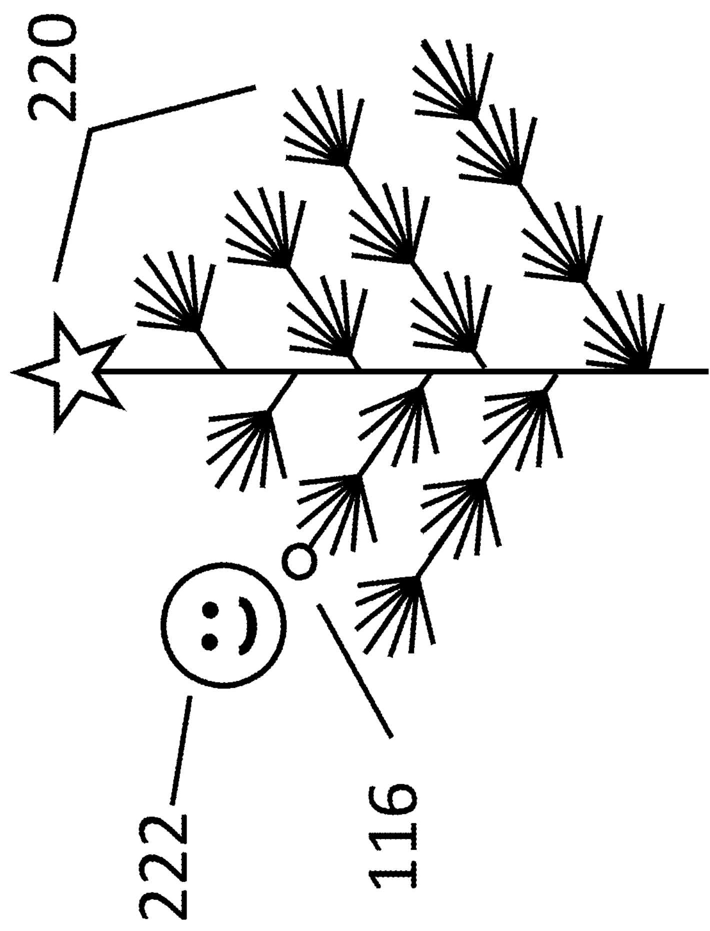
FIG. 2 illustrates a view for an observer of a scene while looking through an ideal far field viewing device.

Referring to FIG. 2, an idealized view of the overall scene as seen through an ideal far field viewing device is illustrated. The ideal view contains a well-focused representation of scene elements 220 in addition to a desired diffracted light pattern 222 produced by light diffracted by the far field hologram adjacent a bright compact source of light 116. In the example, the hologram has been tailored to diffract the light pattern in the form of a simple smiling face. FIG. 2 shows only one bright compact point of light 116 to keep the illustration simple. In the case where many such sources of light are present, the desired diffraction pattern will surround each bright compact source of light.

A salient aspect of far field viewing applications that is different from most display hologram applications is that the observer is encouraged not to focus all of the attention on the holographic diffracted light pattern. Instead, the observer focuses on an overall scene in a unique combination with the holographic diffracted light patterns at each bright point source of light present in the scene. Accordingly, it may be important for the viewing device to present a clear image of the scene while also presenting bright holographic light patterns that are faithful to the intended design. If the hologram is poorly designed or fabricated, the holographic image may differ from the intended design and the overall effect suffers.

Figure 3B:
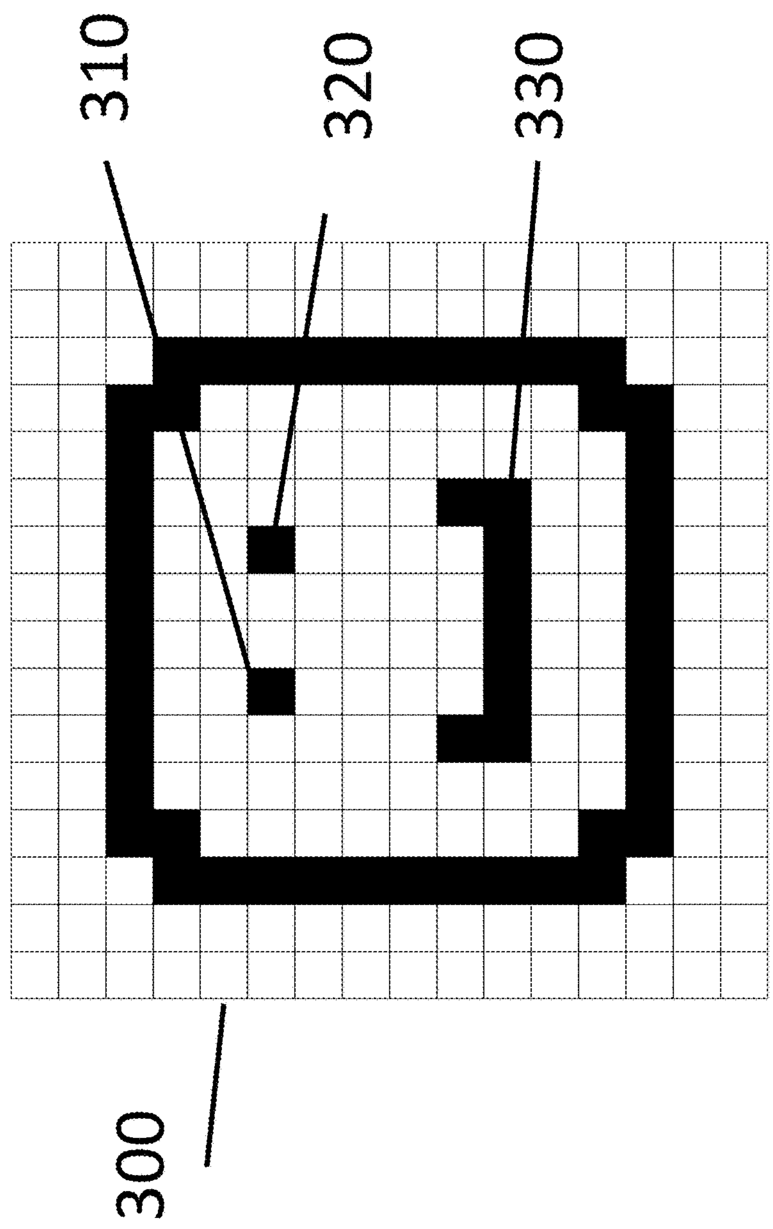
FIG. 3B illustrates the desired image of FIG. 3A to be produced by a far field hologram.

In most applications, the far field viewing device is meant to augment a scene that is already rich in detail with a graphic image that is typically a simple line drawing or a short piece of text. Consider the case of viewing hundreds of Christmas lights on a holiday tree. Even without the viewing device, there is a great deal of intricate detail from the individual needles on the branches of the tree and perhaps a group of ornately decorated wrapped boxes at the foot of the tree. The purpose of the hologram is to overlay a simple image such as the smiley face 222 at the location of each light on the tree. A simple image such as this is said to have a low space bandwidth product (SBP), which is to say that the holographic image covers a small spatial footprint and has a limited spatial resolution. In practical terms, the SBP is proportional to the number of resolvable pixels in the desired overlaid holographic image. As used herein, the SBP is defined to be simply the product of the number of rows and columns in the desired image. FIG. 3B shows the simplified version of the smile face 300 that is the desired image to be produced by a far field hologram. In the version shown in 300 the small squares correspond to individual pixels in the digitized desired image 301 shown in FIG. 3A. The hologram should diffract high light intensity to the points represented by the black pixels in FIG. 3B and should diffract no light to the points represented by the white pixels in FIG. 3B. The SBP of the example in FIG. 3B is 256. This value is lower than typical for the purposes of illustration. More typical numbers are on the order of 1,000 to 10,000.

Practical holograms have a limited number of design parameters which causes the resultant image response to differ from the ideal design. As discussed herein, the term "error image" or the term "noise image" refers to the absolute value of the difference between the ideal image and the simulated hologram response. The low SBP of a typical desired image suggests that even isolated pixel errors may create confusion for the observer. In the example of FIG. 3B, the desired image 300 is a binary valued image of a smiling face with two eyes 310 and 320 and a mouth 330. In the design, a value of 255 may be assigned to the eyes 310 and 320 and to the pixels corresponding to the mouth 330 and the outline of the face. All other pixels may be assigned a value of zero.

Figure 4:
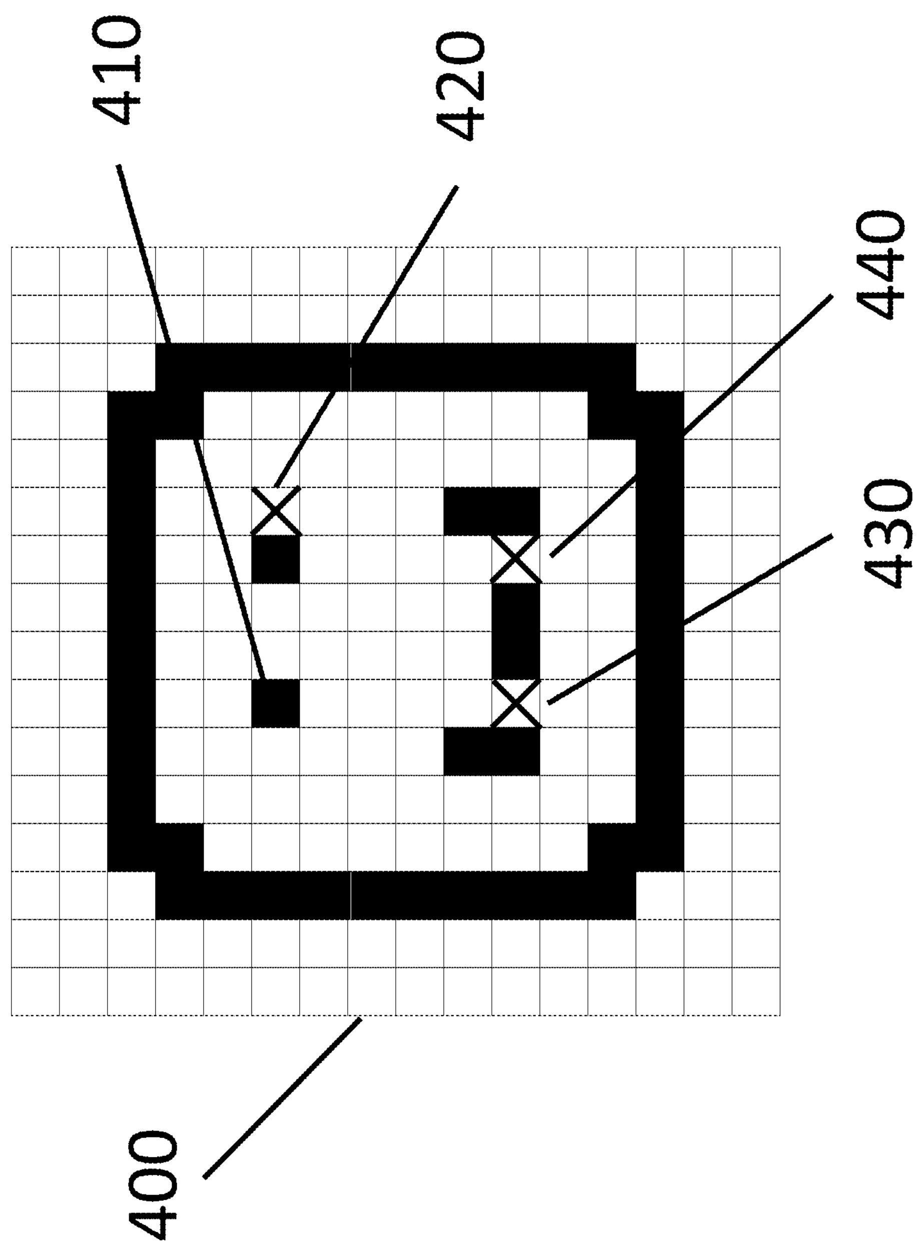
FIG. 4 illustrates the simulated response of a non-ideal hologram with spurious image errors.

FIG. 4 shows a simulated hologram response that differs from the desired response due to limitations of the design process and the implementation of the hologram. In the simulated response 400, none of the pixels are exactly faithful to the ideal image 301, but most pixels that are supposed to be zero produce low values and pixels that are supposed to be 255 are relatively high. Most of the errors are low enough such that they will not register as significant errors to the human visual system. The example of response 400 does have three pixels that exhibit error values that are significantly greater than the mean error. These may be referred to as spurious errors or spurious pixel errors. As used herein, a spurious error or spurious pixel error is an individual pixel error in the holographic reconstruction that has a significant magnitude relative to the mean error, thus potentially creating a noticeable deviation from the desired image effect. FIG. 4 provides an alternative representation of simulation 303 where the spurious error pixels are denoted with an X and the rest of the errors are suppressed for ease of illustration. Specifically, two pixels that are supposed to be bright result in low brightness and one pixel that is supposed to have no light has appreciable light as illustrated in FIG. 4. The human visual system has a high tolerance for small amounts of error. Because of this tolerance, pixel response values that are reasonably close to a value of 255 are depicted as effectively black and pixel values that are reasonably close to a value of zero are depicted as effectively white in FIG. 4. In the example, there are three pixels marked with an X that have sufficient error to cause ambiguity as to whether they are supposed to be black or white. For example, the left eye 410 appears compact but the right eye 420 now appears to be extended horizontally and may appear as a winking eye to the observer. Similarly, the ambiguous pixels in the mouth 430, 440 may appear as missing teeth. The overall effect of these three isolated ambiguous pixels may create a different effect than the one that was intended by the designer. As used herein, pixel errors that are significantly greater than the mean error, such as those indicated by an X in FIG. 4, are referred to as spurious errors.

Figure 5:
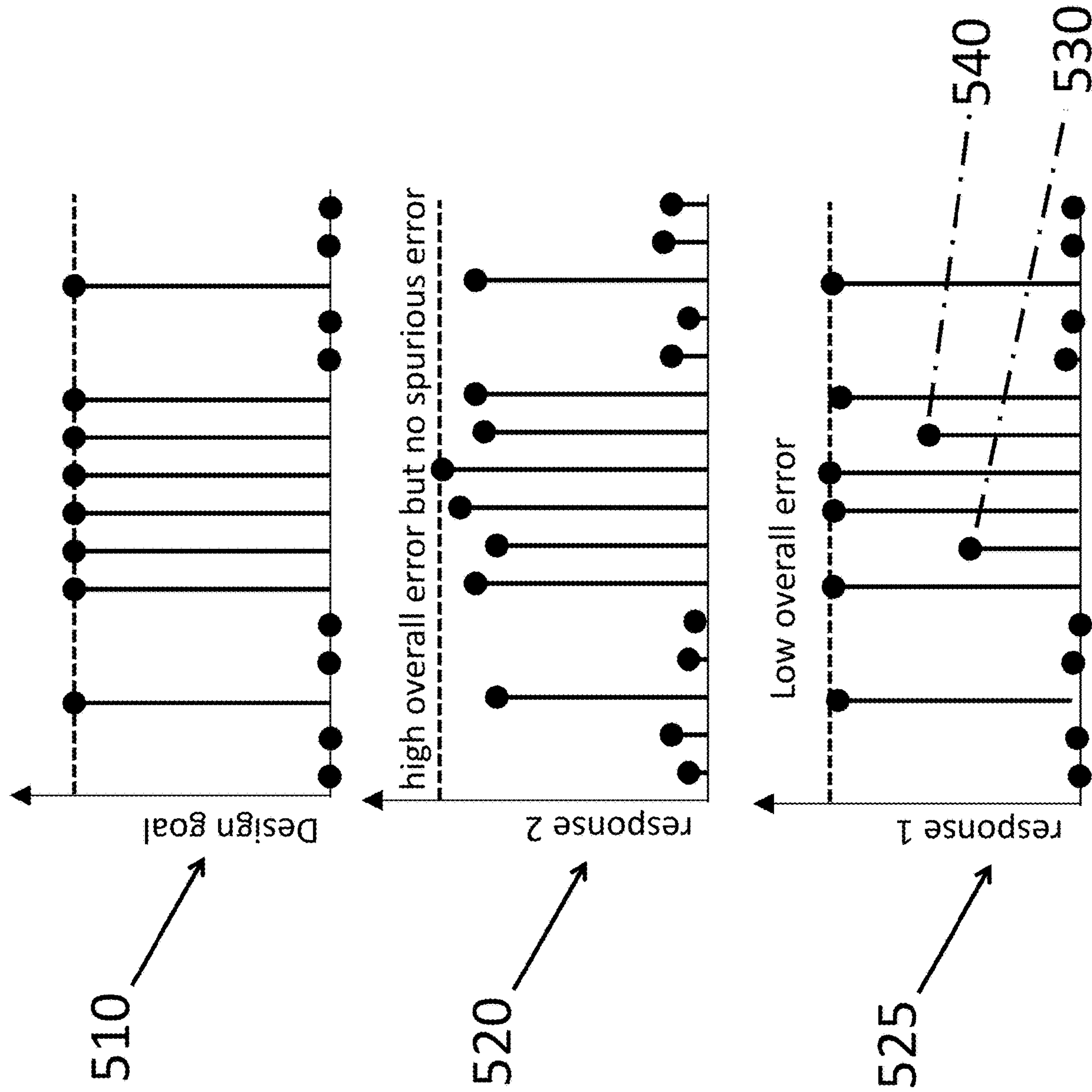
FIG. 5 illustrates the brightness values for a single row in a desired hologram image as well as values corresponding to two non-ideal realizations corresponding to two imperfect holograms.

Consider FIG. 5 which shows different responses for the pixel row corresponding to the horizontal portion of the mouth of the smiling face. The designed response 510 matches the desired response as illustrated in FIG. 3B, with the horizontal row for the smiling face mouth feature 330 having binary values of zero for white space pixels and value of 255 assigned to the dark pixels. Hologram performance is typically measured by an overall error, such as the mean squared error in the image produced by the hologram. The mean squared error is calculated by first summing the square of the pixels in the error image and then dividing by the number of pixels. The error image is calculated by subtracting the simulated holographic image or hologram response from the desired image after appropriate normalization of the holographic image. Response 520 illustrates one proposed acceptable response that has a relatively high mean squared error. Despite the high error, the human visual system has enough tolerance to render the image as acceptable. The values that are supposed to be bright are bright and the values that are supposed to be dark are dark. Response 525 shows an unacceptable response that has a lower mean squared error than the error in acceptable response 520. In 525, all but two of the pixels have close to zero error resulting in a low overall error despite high spurious errors at pixels 530 and 540. The values at 530 and 540 are different enough from the rest of the mouth that the observer may mistake them for missing teeth. An overall error measure such as the mean squared error criterion favors response 525 over 520 even though 520 might yield a more acceptable image to the observer.

The example responses 520 and 525 suggest that common error measures and typical computer-generated hologram design techniques may incorrectly favor designs that may exhibit spurious errors and give less-faithful responses to a human viewer. The low SBP nature of the holograms that are utilized in a far field viewing application may be particularly susceptible to the spurious errors of response 525.

The problem of suppressing spurious errors is not common in the design of computer-generated holograms for image display. Most display holograms are intended to produce images that have a large amount of spatial detail and correspond to high SBP images. There will always be some amount of error in a holographic reconstruction and in most high SBP cases, a spurious error at one pixel will not be noticed. For high SBP hologram design, it is more important to suppress the distributed or overall error which can lead to a speckle-like effect over the whole image that manifests itself as a distracting texture as discussed in F. Wyrowski, R. Hauck and O. Bryngdahl, "Computer-generated holography: hologram repetition and phase manipulations" Journal of the Optical Society of America, v. 4, pp. 694-698 (1987), hereby incorporated by reference in its entirety. It is relevant to note that many high SBP hologram applications rely on highly coherent laser light that exacerbates the speckle phenomenon. In contrast, other low SBP far field hologram applications, such as those discussed herein with observers viewing a bright compact source of light (e.g., 116) through a far field viewing device (e.g., 100), takes advantage of low coherence light sources such as LEDs and incandescent lights. Low coherence sources are immune to speckle and can tolerate a relatively high spatially distributed error term.

There is a wealth of research directed toward the optimal design of computer-generated holograms that seeks to minimize the overall error in the final image. See e.g., J. N. Mait, "Understanding diffractive optic design in the scalar domain," J. Opt. Soc. Am. A, V. 12, No. 10 (1995), hereby incorporated by reference in its entirety, for a review of a wide variety of design methods. The underlying mathematical algorithms in the majority of these methods involve minimizing an overall error term. These algorithms typically converge when the overall error is minimized in a mean squared sense and do not explicitly penalize spurious errors. Attempts to modify such algorithms to minimize spurious errors would tend to create difficulty with the convergence and also raise the overall error term.

What is needed is an approach to the design and fabrication of computer generated far field holograms that minimizes spurious errors while maintaining acceptable overall noise in order to ensure that the actual response corresponds to the intended perception of a tailored low SBP image.

Far field holograms intended for far field viewing applications exhibit shift-invariance. This means that as the far field hologram is translated laterally with respect to an illuminating beam of light, the intensity distribution of the diffracted light pattern does not change substantially. This also means that the entire hologram need not be illuminated to produce the desired diffracted pattern. In practice, illuminating a very small portion of the hologram will still reproduce the entire diffracted pattern. Note that if the portion is made too small, the quality of the diffracted light pattern will degrade excessively. As used herein, a unit hologram region may mean a small portion of the overall hologram that produces an acceptable quality diffracted pattern. Typically, far field holograms used for far field viewing applications are composed of spatially repeated copies of a unit hologram.

Similarly, for a fixed position hologram, the eye can make small rapid movements without changing the diffracted light pattern. This shift-invariant property is generally desirable so that the viewer does not need to maintain a rigidly fixed position with respect to the hologram. This also means that the entire hologram need not be illuminated to produce the desired diffracted pattern.

Figure 6:
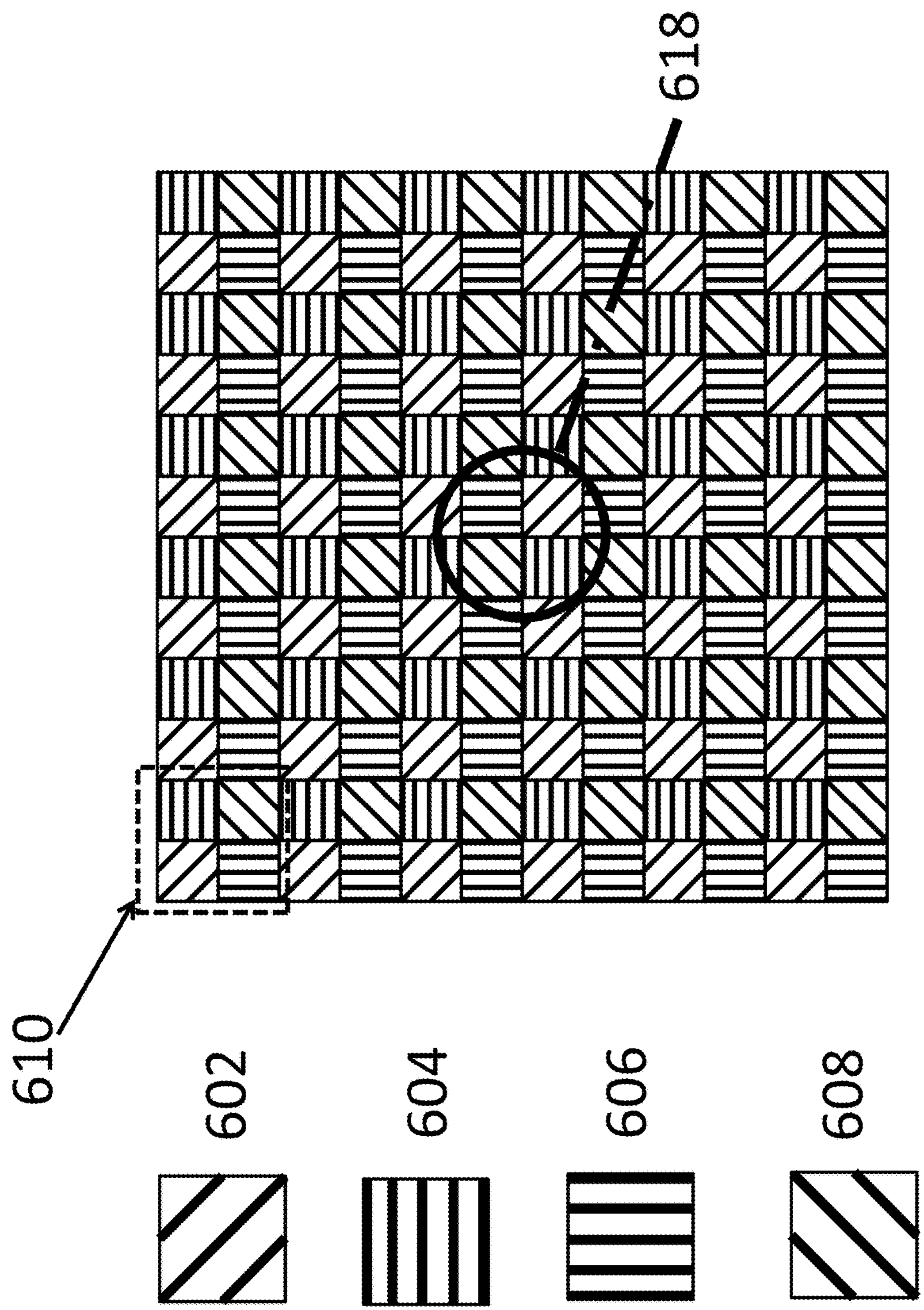
FIG. 6 illustrates a large far field hologram composed of a cluster of four different square unit holograms all designed with the same target image.

FIG. 6 illustrates a large far field hologram composed of a cluster of four different square unit holograms each designed to produce the same target image. The observer does not make use of the whole hologram when the hologram is larger than the utilized hologram area. As was discussed previously, the utilized hologram area 618 is that area that contributes to the observer's view. When the hologram is relatively far from the eye, the utilized area is determined by the angular field-of-view of the eye and the distance from the eye to the hologram. When the hologram is mounted in spectacle frames, the hologram is very close to the eye and the utilized area 618 is approximately equal to the size of the pupil of the eye. The pupil of the human eye is on the order of 2 to 8 mm depending on lighting conditions.

Many unit hologram regions may fit within the utilized hologram area 618 of a hologram designed for far field viewing applications. The effective response of the hologram is the average of the responses from each unit hologram that comprise the utilized hologram area 618. In most far field hologram applications one identical unit hologram is spatially repeated over the entire utilized hologram area 618.

In other far field hologram applications, the use of only one identical unit may be deviated from, and two or more different unit holograms, such as four different unit holograms in a two by two hologram cluster, more than four holograms, etc., may be used. There is no advantage to having more unit holograms than fit within the utilized hologram area. The number of unit holograms that fit within the utilized hologram area is designated here as M. Experience of typical light source conditions has shown, that a unit hologram large enough to form an acceptable image has an area of approximately 1.75 mm squared. In a spectacle frame embodiment of a far field viewing device, the utilized hologram area is determined by the size of the pupil of the eye. The case of a 3 mm diameter pupil area and corresponding utilized hologram area corresponds to M~4 which suggests that a repeated 2 by 2 cluster of unit holograms is sufficient. FIG. 6 shows a two by two cluster 610 composed of four different unit hologram designs denoted 602, 604, 606, and 608. Each hologram design is a complicated distribution of microscopic pixels such as seen in 302 (FIG. 3A) and the cross hatching in 602, 604, 606, and 608 is merely a visual scheme used to differentiate four different holograms designs each intended to produce the desired image. Each of the four unit holograms 602, 604, 606, and 608 may be designed using the same iterative Fourier transform hologram technique described in Gallagher, but each receives different initial phase conditions. The image plane phase may be treated as a free variable and a different random phase array may be chosen for each of the four unit holograms 602, 604, 606, and 608. For each hologram design, the algorithm bounces back and forth between the image domain and the Fourier domain. In the Fourier domain, the values are quantized as dictated by the nature of the hologram implementation. In the image domain, the amplitude values are forced back to the ideal values at each iteration. This process modifies the phase at each iteration while the overall noise measure improves at each iteration. For a sufficiently large number of iterations, all of the four different designs converge to almost an identical overall error level. Because the initial phase values are all different, the noise patterns are different, even though the overall noise measures are the same. When all four holograms 602, 604, 606, and 608 are employed in a cluster, the observer sees an averaging effect of all of the unit holograms inside the utilized area. The overall noise is smoothed and reduced by this averaging of the four different unit holograms 602, 604, 606, and 608. A cluster arrangement of unit holograms 602, 604, 606, and 608 may be used to reduce the speckle-like noise behavior of far field holograms without directly addressing the spurious noise behavior.

Various embodiments capitalize on the cluster hologram technique and may also be used to improve spurious noise performance. A blind use of the cluster hologram technique could actually worsen spurious noise performance. Consider the case where the designer intends to create a four unit hologram cluster and the first of the four designs has a very low incidence of spurious noise. Subsequently the designer generates three additional unit holograms designs each having a high incidence of spurious noise pixels. If the spurious noise detracts from the intended image, the use of only a single unit hologram based on the first design might be more advantageous than the cluster method where three of the four hologram designs have high incidences of spurious noise pixels.

Figure 8:
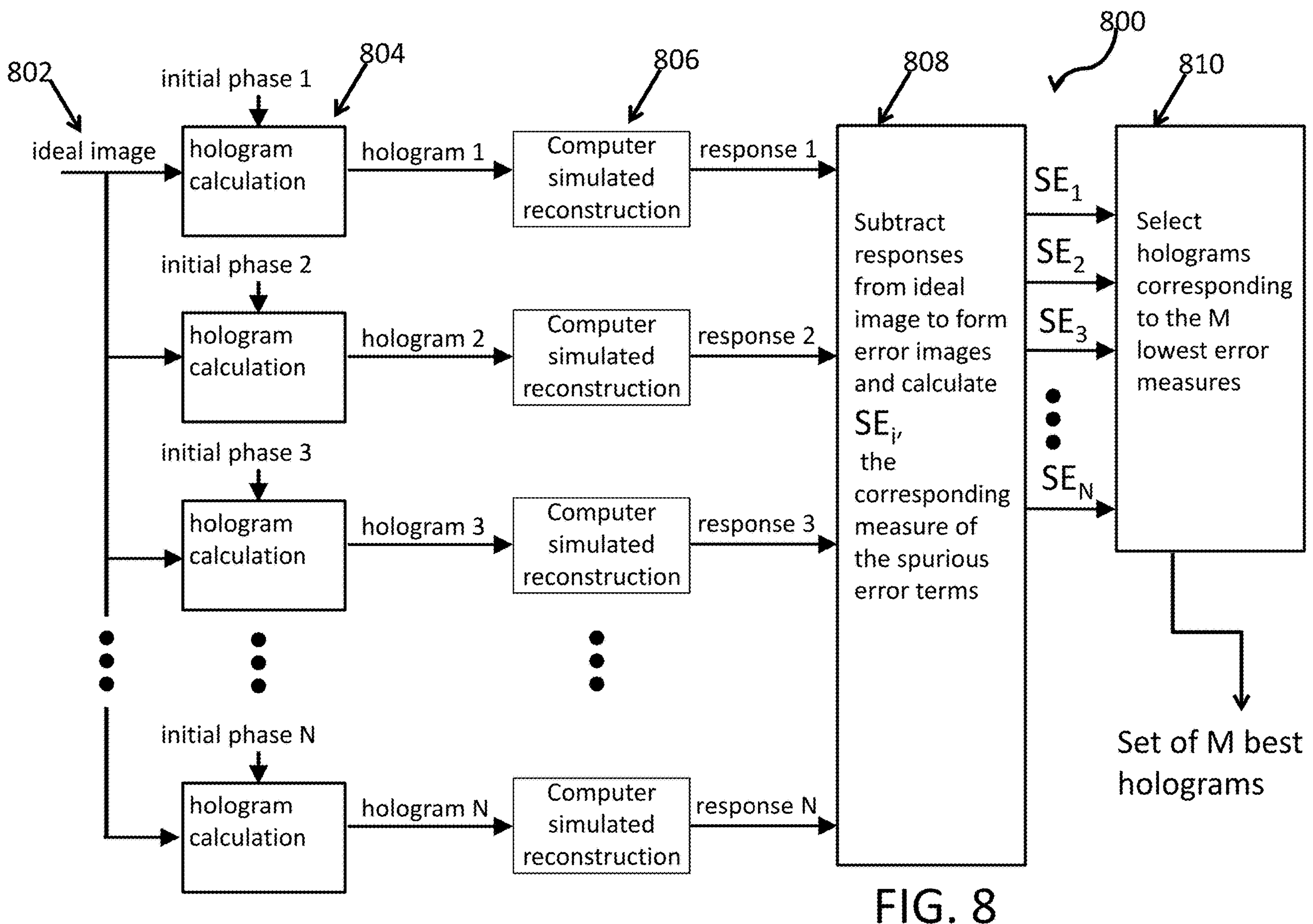
FIG. 8 is process flow diagram illustrating an embodiment method for hologram cluster design.

The various embodiments provide a hologram cluster design method 800 as illustrated in FIG. 8. FIG. 8 illustrates the design method 800 of computing N different holograms each with a different initial random phase followed by a selection process to find the M best designs as determined by the spurious and overall noise attributes of the corresponding N simulated responses. The choice of N is dictated by the available computing resources. Ideally, one would calculate an infinite number of holograms in order to find the M best holograms. In practice, computing resources limit the value of N. In various embodiments, the operations of method 800 may be performed by the processor of a computing device. The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

In operation 802, an ideal image may be selected and provided to the processor. In operation 804, the processor may generate N different unit hologram designs, such as "hologram 1", "hologram 2", "hologram 3", "hologram N", etc., each having a respective different phase condition, such as initial phase conditions "initial phase 1", "initial phase 2", "initial phase 3", "initial phase N", etc. In this manner, the processor may generate a superset of N different candidate hologram designs from the ideal image selected and provided in operation 802. In operation 806, the processor may generate a computer simulated reconstruction of each of the N different unit hologram designs. The respective responses, "Response 1", "Response 2", "Response 3", "Response N" are each subtracted from the ideal image to determine the corresponding error images for each of the N different unit hologram designs and may be evaluated by the processor in operation 808. As part of the evaluation in operation 808, the processor may compute $SE_i$, a measure of the spurious error level in each of the N error images where "i" corresponds to the response number 1 through N for that respective response. In various embodiments, the processor may select a number of holograms from the superset of different candidate holograms. For example, in operation 810 the processor may rank the spurious error measures and then select the M best holograms corresponding to the M lowest spurious error measures. For example, the processor may select the M number of responses that each have the M lowest incidences of spurious noise pixels. Other examples of selecting the M number of responses are discussed below. The holograms corresponding to the selected M number of responses may be used to create a cluster of M unit holograms that is then repeated to form the larger hologram. In this manner, the selected holograms may be arranged into a cluster of holograms repeated to form a larger digital hologram.

The key to operation 808 is to define an appropriate measure for SE, the spurious error term. The task of specifying an absolute measure that is applicable to a variety of different input images is difficult. However, there are a number of valid ways of providing a relative term such that the spurious error measure can be ranked in the N candidate hologram responses and select the M holograms corresponding the M lowest measures. One very simple measure is to define $SE_i$ to be equal to the greatest error pixel value in the response corresponding to candidate hologram i. Alternatively, the spurious error can be evaluated in terms of mean and standard deviation of the error image. A useful definition for the spurious error measure is the number of pixels in the error image that are greater than $P\sigma$, where P is an appropriate constant and $\sigma$ is the standard deviation of the error image. For example, the number of pixels in each error image that are greater than $3\sigma$ may be counted. It is important to remember that the ultimate goal is to avoid spurious errors that are distracting to a human viewer. With that in mind, the choice of P may be guided by having a human observer who has spent time with a large number of sample images and corresponding simulated hologram responses. After the human observer has designated the responses that he or she deems to have undesirable spurious errors, a subsequent analysis of the data can determine the value of P that creates an error measure $SE_i$ that results in the same determination. A current best estimate for a useful value of P is 3.5. In various embodiments, a number of holograms M from the superset of different candidate holograms N may be selected such that each of the selected M holograms has a hologram response with a maximum spurious noise term below a noise threshold. The noise threshold may be predetermined and stored in a memory available to the processor in various embodiments. In various embodiments, a number of M holograms from the superset of N different candidate holograms may be those M holograms with the lowest error measures among the superset of N different candidate holograms. As a specific example of selecting four (e.g., M=4) holograms from a superset of ten (e.g., N=10) different candidate holograms, each of the superset of ten different candidate holograms may have its respective spurious error measurement determined as a number of pixels in the candidate hologram's respective error image that are greater than 3.5 (e.g., a constant) multiplied times the standard deviation of the error image a for that candidate hologram (e.g., $SE_i$=number of pixels greater than 3.5 times $\sigma$). In keeping with this specific example, the outputs for each spurious error measurement ($SE_i$) may be: $SE_1=3$, $SE_2=1$, $SE_3=10$, $SE_4=3$, $SE_5=4$, $SE_6=7$, $SE_7=5$, $SE_8=8$, $SE_9=11$, $SE_{10}={}_2$. Based on those example spurious error measurements, the four (e.g., M=4) holograms from the superset of different candidate holograms may be selected such that the selected four holograms have the lowest relative spurious error measurements of the superset of different candidate holograms. For example, candidate holograms 1, 2, 4, and 10 may be selected as their respective spurious error measurements (e.g., $SE_1=3$, $SE_2=1$, $SE_4=3$, $SE_{10}={}_2$) are the four (e.g., M=4) lowest spurious error measurements of the ten spurious error measurements determined.

An alternate method of selecting the M best holograms may be to replace processes 808 and 810 with a human observer. Since the ultimate consumer of the hologram image is a human observer, the most effective way to rank the hologram performance may be with a human observer. The processor may display the responses resulting from operation 806 to a user/observer. The user/observer may view all N unit hologram responses and may indicate (e.g., choose via user interface element, such as a radio button, clickable tag, etc.) the M responses to use for the hologram cluster. The M responses selected by the user/observer may be the M responses with minimal spurious errors and/or may be the M responses the user/observer finds most appealing and/or suitable. The user/observer may understand the context of the spurious noise, which may be often important in the assessment. For example, consider the case of an image that contains a very small annulus. If spurious noise pixels occur in the center of that small annulus, it may appear to be filled in and ceases to appear as an annulus. But if the spurious noise pixel occurs several pixels away from any important detail in the image, it may not be problematic for recognizing the image. Note that there is no need to perform the intermediate step of calculating the error image in the case of a human observer. While a human employed method is discussed above, a trained machine learning algorithm may be substituted for the user/observer, such as machine learning using a convolutional neural network substituted for the user/observer. The machine learning algorithm may be trained to synthesize a fully automated method that takes image context into account.

In various embodiments, the hologram cluster design method 800 may be used to produce amplitude or phase holograms. As one example for amplitude holograms, the value of N may be ten and the value of M may be four. As such, ten square holograms may be computed employing an iterative Fourier transform algorithm with at least 100 iterations. The holograms may be of dimension 128 pixels by 128 pixels where each pixel corresponds to a 10 micrometer by 10 micrometer square of physical space. The ten simulated hologram responses may be computed (e.g., N=10) and four holograms (e.g., M=4) corresponding to the lowest spurious error measures may be selected. The spurious error measure may be the number of pixels in the error image that are above $3.5\sigma$. The four holograms are spatially replicated in a 100 percent fill factor manner such that there is no clear space between holograms as seen in FIG. 6.

As another example, for phase holograms, the value of N may be ten and the value of M may be four. Designs may be computed for ten 1.1 mm diameter high diffraction efficiency circular holograms with approximately 340 pixel diameter and four distinct phase levels. An iterative Fourier transform algorithm with at least 100 iterations may be used to provide good overall noise performance for each of the ten holograms. The design technique discussed in this example is based on an iterative Fourier transform algorithm. However, there are a variety of other techniques, including simulated annealing and genetic algorithms that may also be employed in the various embodiments in place of the Fourier transform algorithm.

Figure 7:
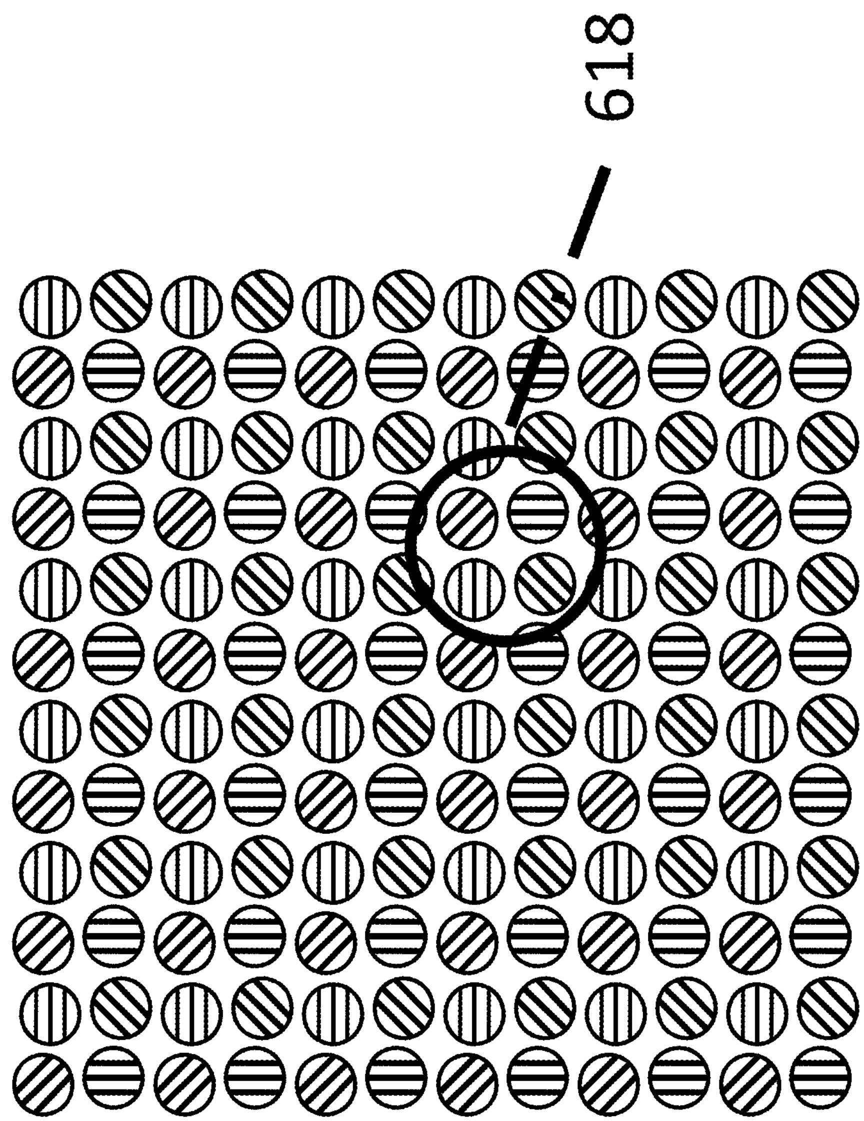
FIG. 7 illustrates a large far field fill factor modulated hologram composed of a unit cell of four different circular unit holograms all designed to produce the same target image.
Figure 7:
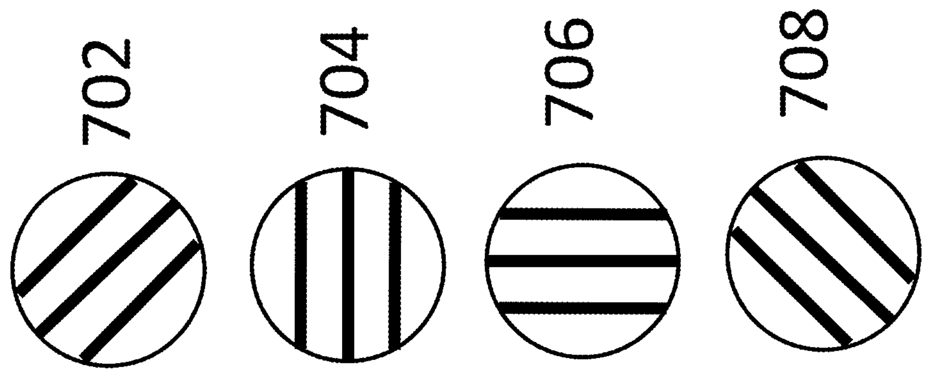

After designing the ten candidate holograms, a human observer may select the four best unit hologram responses in a spurious noise sense. The observer compares simulated responses to the ideal image and may rank the responses with respect to the spurious noise performance to select the four best unit holograms. The four best unit holograms may be arranged in a two by two cluster maintaining enough clear space between the unit holograms to reduce the diffraction efficiency according to the method of U.S. Pat. No. RE 39,864. The four holograms are spatially replicated as indicated in FIG. 7. FIG. 7 shows a two by two cluster composed of four different circular unit hologram designs denoted 702, 704, 706, and 708. The percentage of holographic regions to the total region is called the fill factor. A fill factor of 52 percent may produce sufficient hologram image brightness while maintaining acceptable visual acuity. FIG. 7 also shows the utilized hologram area 618.

Figure 9:
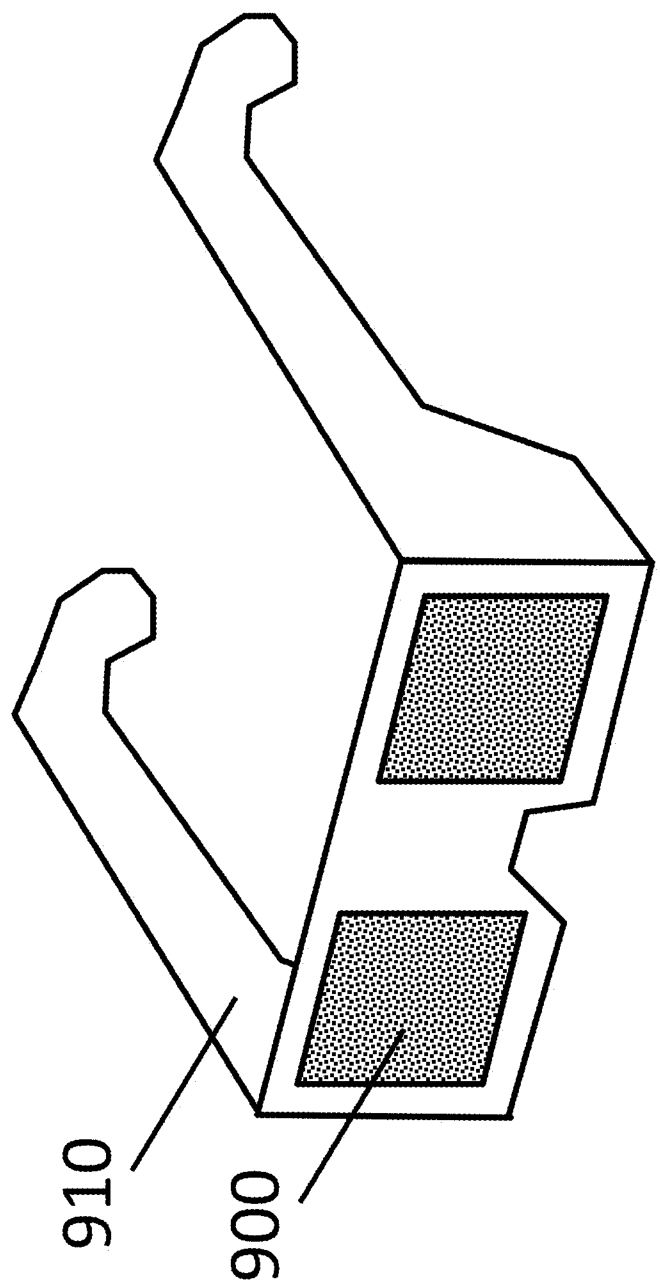
FIG. 9 illustrates a far field viewing device comprised of far field holographic lenses mounted in a spectacle frame.

For both amplitude and phase design techniques, the digital hologram resulting from the operations of method 800 may then be implemented as a physical hologram by any of a variety of techniques, such as those discussed in the textbook MICROOPTICS in chapter 4. The physical hologram may be used as a master and copied or replicated using a variety of techniques as discussed in chapter of 6 of Herzig's MICROOPTICS. The copied hologram 900 may then be mounted in an appropriate far field viewing frame or support structure, such as the spectacle frame 910 shown in FIG. 9. More generally the frame might be a monocular eyepiece, a window frame or a rigid frame designed for use in a digital camera.

Figure 10:
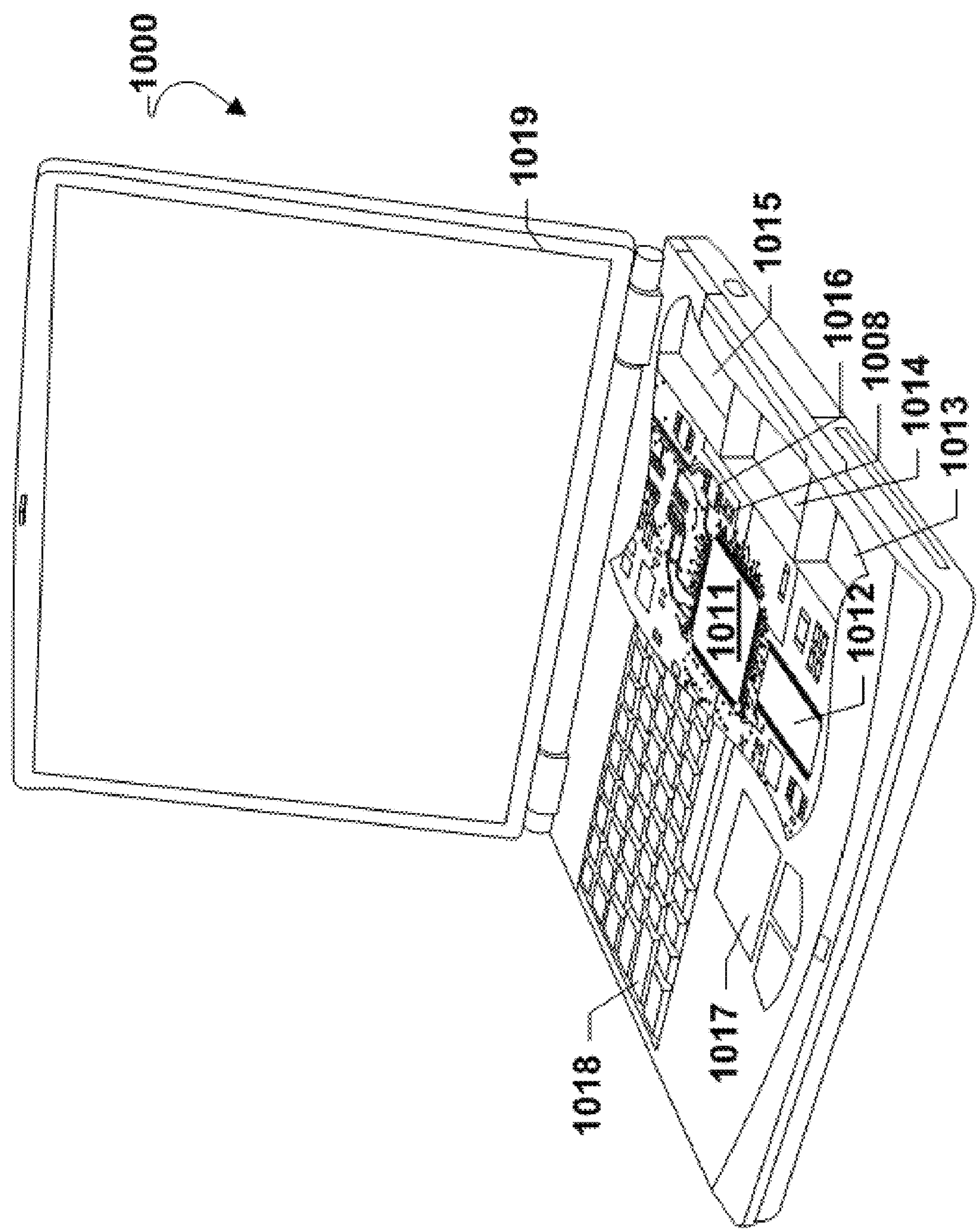
FIG. 10 illustrates an example computing device suitable for use with the various embodiments.

The various embodiment methods may be performed partially or completely on a variety of computing devices, such as a laptop computer 1000 illustrated in FIG. 10. Many laptop computers include a touchpad touch surface 1017 that serves as the computer's pointing device, and thus may receive drag, scroll, and flick gestures similar to those implemented on mobile computing devices equipped with a touch screen display and described above. A laptop computer 1000 will typically include a processor 1011 coupled to volatile memory 1012 and a large capacity nonvolatile memory, such as a disk drive 1013 of Flash memory. Additionally, the computer 1000 may have one or more antennas 1008 for sending and receiving electromagnetic radiation that may be connected to a wireless data link and/or cellular telephone transceiver 1016 coupled to the processor 1011. The computer 1000 may also include a floppy disc drive 1014 and a compact disc (CD) drive 1015 coupled to the processor 1011. In a notebook configuration, the computer housing includes the touchpad 1017, the keyboard 1018, and the display 1019 all coupled to the processor 1011. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for making a far field transmission hologram, the method comprising:

generating a superset of different candidate hologram designs from an ideal image, the superset of different candidate hologram designs including a first number of different candidate hologram designs;

selecting a second number of hologram designs from the superset of different candidate hologram designs such that each of the selected second number of hologram designs has a hologram response with a maximum spurious noise term below a predetermined noise threshold for hologram responses, wherein the second number of hologram designs is less than the first number of different candidate hologram designs;

arranging the selected second number of hologram designs into a cluster of hologram designs repeated to form a larger digital hologram design, wherein the cluster of hologram designs is configured to have an overall hologram response resulting from linear averaging of the hologram responses of the selected second number of hologram designs by a human observer's eye or an image capture device; and forming a physical hologram from the larger digital hologram design.

2. The method of claim 1, wherein selecting the second number of hologram designs from the superset of different candidate hologram designs comprises selecting the second number of hologram designs from the superset of different candidate hologram designs corresponding to lowest error measures among the superset of different candidate hologram designs.

3. The method of claim 1, wherein selecting the second number of hologram designs from the superset of different candidate hologram designs comprises:

displaying individual simulated hologram responses for each of the superset of different candidate hologram designs; and visually evaluating the displayed individual simulated hologram responses to select the second number of hologram designs from the superset of different candidate hologram designs.

4. The method of claim 1, wherein selecting the second number of hologram designs from the superset of different candidate hologram designs comprises:

determining for each of the superset of different candidate hologram designs a spurious error measurement as a number of pixels in that candidate hologram design's respective error image that are greater than a constant multiplied by a standard deviation of that candidate hologram design's respective error image, wherein that candidate hologram design's respective error image is an absolute value of a difference between the ideal image and a simulated hologram response of that candidate hologram design;

selecting the second number of hologram designs from the superset of different candidate hologram designs such that the selected second number of hologram designs have the lowest relative spurious error measurements of the superset of different candidate hologram designs.

5. The method of claim 4, wherein the constant is 3.5.

6. The method of claim 1, wherein each of the selected second number of hologram designs is a different amplitude hologram design.

7. The method of claim 1, wherein each of the selected second number of hologram designs is a different phase hologram design.

8. The method of claim 1, wherein the selected second number of hologram designs is four.

9. The method of claim 8, wherein the first number of different candidate hologram designs is ten.

10. The method of claim 1, further comprising:

mounting the physical hologram in a frame of a far field viewing device.

11. A method for making a far field transmission hologram, the method comprising:

generating a superset of different candidate phase hologram designs from an ideal image, the superset of different candidate hologram designs including a first number of different candidate phase hologram designs;

displaying individual simulated phase hologram responses for each of the superset of different phase candidate hologram designs;

visually evaluating the displayed individual simulated hologram responses;

selecting a number of phase hologram designs from the superset of different candidate phase hologram designs based at least in part on the visual evaluation of the displayed individual simulated phase hologram responses, wherein the number of selected phase hologram designs is less than the first number of different candidate phase hologram designs;

arranging the selected phase hologram designs into a cluster of phase hologram designs repeated to form a larger digital phase hologram design, wherein the cluster of phase hologram designs is configured to have an overall hologram response resulting from linear averaging of the hologram responses of the selected phase hologram designs by a human observer's eye or an image capture device; and forming a physical phase hologram from the larger digital phase hologram design.

12. The method of claim 11, wherein the number of selected phase hologram designs from the superset of different candidate phase hologram designs is four.

13. The method of claim 12, wherein the first number superset of different candidate phase hologram designs is ten different candidate phase hologram designs.

14. The method of claim 13, further comprising:

mounting the physical phase hologram in a frame of a far field viewing device.

15. A method for making a far field transmission hologram, the method comprising:

generating a superset of different candidate amplitude hologram designs from an ideal image, the superset of different candidate amplitude hologram designs including a first number of different candidate amplitude hologram designs;

determining for each of the superset of different candidate amplitude hologram designs a spurious error measurement as a number of pixels in the candidate amplitude hologram's hologram design's respective error image that are greater than a constant multiplied by a standard deviation of the candidate amplitude hologram design's respective error image, wherein that candidate amplitude hologram design's respective error image is an absolute value of a difference between the ideal image and a simulated amplitude hologram response of that candidate amplitude hologram design;

selecting a number of amplitude hologram designs from the superset of different candidate amplitude hologram designs such that the selected amplitude hologram designs have the lowest relative spurious error measurements of the superset of different candidate amplitude hologram designs, wherein the number of selected amplitude hologram designs is less than the first number of different candidate amplitude hologram designs;

arranging the selected amplitude hologram designs into a cluster of amplitude holograms repeated to form a larger digital amplitude hologram design, wherein the cluster of amplitude hologram designs is configured to have an overall hologram response resulting from linear averaging of the hologram responses of the selected amplitude hologram designs by a human observer's eye or an image capture device; and;

forming a physical amplitude hologram from the larger digital amplitude hologram design.

16. The method of claim 15, wherein the number of selected amplitude hologram designs from the superset of different candidate amplitude hologram designs is four.

17. The method of claim 16, wherein the first number of different candidate amplitude hologram designs is ten different candidate amplitude hologram designs.

18. The method of claim 17, wherein the constant is 3.5.

19. The method of claim 18, further comprising:

mounting the physical amplitude hologram in a frame of a far field viewing device.

* * * * *